United States Patent [19]

Cappelli et al.

[11] Patent Number: 4,958,862
[45] Date of Patent: Sep. 25, 1990

[54] HERMETIC METAL PIPE JOINT

[75] Inventors: Cataldo Cappelli, Dalmine; Norberto Morlotti, Bergamo, both of Italy

[73] Assignee: Dalmine SpA, Milan, Italy

[21] Appl. No.: 414,925

[22] Filed: Sep. 29, 1989

[30] Foreign Application Priority Data

Oct. 3, 1988 [IT] Italy .................... 48411 A/88

[51] Int. Cl.$^5$ ............................. F16L 25/00
[52] U.S. Cl. ........................ 285/334; 285/422
[58] Field of Search ............. 285/334, 333, 422

[56] References Cited

U.S. PATENT DOCUMENTS

| | | | |
|---|---|---|---|
| 2,111,627 | 3/1938 | Hinderliter | 285/333 X |
| 3,856,337 | 12/1974 | Ehm et al. | 285/334 |
| 3,870,351 | 3/1975 | Matsuki | 285/334 |
| 4,153,283 | 5/1979 | Hellmund et al. | |
| 4,736,967 | 4/1988 | Mott et al. | |

FOREIGN PATENT DOCUMENTS

| | | | |
|---|---|---|---|
| 0150657 | 8/1985 | European Pat. Off. | |
| 0273016 | 6/1988 | European Pat. Off. | |
| 1533619 | 6/1970 | Fed. Rep. of Germany | 285/334 |
| 1564218 | 4/1969 | France | |
| 2324973 | 4/1977 | France | |
| WO84/02948 | 8/1984 | Int'l Pat. Institute | |
| 7510249 | 3/1977 | Netherlands | 285/334 |

*Primary Examiner*—Dave W. Arola
*Attorney, Agent, or Firm*—Young & Thompson

[57] ABSTRACT

Hermetic metal pipe joint, comprising a male element with at least one external tapered thread and a female element with complementary internal threads. An end part of the male element beyond each thread has a conical seal surface and the female element has a conical seal surface with the same taper as that of the conical surface of the male element. The two conical surfaces on the male and female elements mate upon tightening of the joint. The length of the seal surface of the female element along the generatrix is greater than that of the corresponding seal surface of the male element. These two seal surfaces of the male and female elements have a taper in the range 6.25 to 9.25% relative to the axis of the conical seal surface. The length of the surface of the male element which comes into contact with the corresponding surface of the female element is between 0.5 and 2.5 mm. The end part of the male element has a nose with a conical seat surface that mates, upon tightening of the joint, with a similar conical seat surface in the inner part of the female element. These seat surfaces have the same taper as each other, in the range 5° to 10° with respect to a plane perpendicular to the joint axes. These seat surfaces contact each other only after mating of the seal surfaces.

4 Claims, 2 Drawing Sheets

HERMETIC METAL PIPE JOINT

DESCRIPTION

The object of the present invention is a hermetic metal pipe joint, especially for pipes used for pumping fluids and casing for wells utilized mainly but not exclusively for the exploration and production of hydrocarbons and geothermal fluids.

For such uses, of course, the joint between one pipe and the next is made either by cutting a male thread on one end and a female thread on the other (integral coupling) or by cutting male threads on both ends of the pipe and then utilizing a hollow sleeve having two female threads (sleeve coupling). In general said threads are preferably tapered.

These joints must not only ensure the union of the pipes in question and be strong enough to withstand mechanical stresses, they must also prevent the leakage of liquids and gases flowing through the pipes. The seal can be formed by appropriate interference between the threads on the male and female elements or by utilizing suitable seal surfaces, separate from the threads which, when properly pressed together, prevent the passage of fluids. These techniques can, of course, be combined.

It is known that when the torque used to tighten a joint is higher than the yield strength of the material, stresses induced in the threads and in such supplementary sealing devices as may be used can cause damage, so that the seal provided by the joint is no longer effective, especially after it has been repeatedly made-up and unscrewed. This drawback has been eliminated by the development of the thread described in European Patent Application EP 273016.

However, it has been felt that the joints described there can be further improved by appropriately modifying the seat surfaces and by inserting specific seal surfaces (henceforth called "hermetic metal seal" or "metal seal"), so as to improve the screwability both in terms of the number of screwing/unscrewing cycles possible and as regards overtorque, thus guaranteeing best seal conditions in every situation.

Overtorque can, of course, irreversibly modify the geometry of the seal devices (or surfaces) owing to plastic deformation resulting from excessive stresses, so reuse of the pipe either becomes problematical or completely impossible. The pipe may suffer damage even when it is used the first time and this can initiate stress corrosion phenomena.

To overcome these difficulties, therefore, it is necessary to combine one or more seal devices (hermetic metal seal), with a mechanical element (seat) which can positively limit interference, and hence the stresses on the seal devices themselves, even when the tightening torque increases to beyond the yield strength of the joint material.

Applications of this principle are known but owing to the geometric solutions adopted they cannot guarantee the high reliability required.

U.S. Pat. No. 4,153,283 describes a special combination of seat and seal surfaces which utilizes the interaction between a spherical surface of the male element with a tapered surface of the female element (metal seal), accompanied by an additional, successive flat seat. However, this solution does not safeguard the joint from the abovementioned defects. In fact, when it is being made-up the first contact occurs between the tapered surface and the spherical one along a circumferential line which is transformed into a finite surface owing to deformation in the tightening phase. Since the contact between said seal surfaces is of the hertzian type—i.e. characterized by a rapid rise in stresses as elastic deformation increases—it is very easy to exceed the elastic limit locally, even with small applied loads, so the spherical surface deforms plastically and the joint can leak readily in the case of settlement of the casing string. Anyway the joint cannot be reused after it has been unscrewed.

Furthermore, in similar joints that are correctly used, the angle of the tapered seat surfaces is around 15°–20° and this may be excessive since overtorque may produce a radial thrust component that generates dangerous local overstresses.

To overcome these drawbacks, the metal seal in other joints is entrusted to the contact between two conical surfaces, one on the male element and the other on the female, which should adapt perfectly to one another. These surfaces are designed to come into contact over a very ample area (and hence over a significant length of their generatrix, e.g. about 5 to 10 mm). In this case contact pressures are always quite small and the seal depends essentially on the labyrinth effect which is generated at the contact of the two conical surfaces.

However, this type of joint calls for extremely precise machining of the conical surfaces, so there are technological, economic and quality-control problems. In fact the possibility of matching one surface to the other is virtually nil.

To avoid all these various difficulties, a joint has been developed for pipes used for pumping fluids and for well casings. This joint, the object of this invention, has a specific combination of surfaces that form the hermetic metal seal, possibly in combination with specific seat surfaces.

Figure 1:
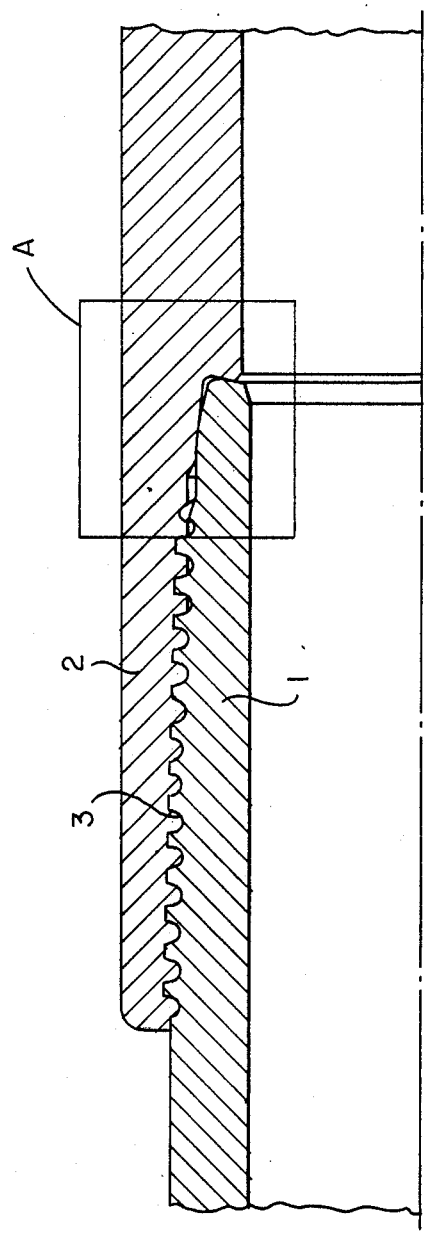
FIG. 1 is an axial section of the threaded joint.

The joint as per this invention consists of a male element with at least an external tapered thread and a female element with complementary internal threading, the end part of said male element beyond each thread having a tapered seal with a mainly axial trend and possibility also an internal seat surface, also tapered, mainly transverse, said surfaces being interacting with similar seal and seat surfaces on said female element, the length of the seal surface of the female element along the main generatrix being greater than that of the corresponding seal surface of the male element, said joint being characterized by the fact that said two seal surfaces of the male and female elements hve a taper of between 6.25 and 9.25%, the length of the surface of the male element which comes into contact with the corresponding surface of the female element being between 0.5 and 2.5 mm.

It is particularly advantageous to couple the metal seal described above with seat surfaces on the male element and on the corresponding female element having a taper with an angle between 5° and 10° to a plane perpendicular to the axis of the joint, said surfaces operating only after the interaction and energization of the threads and the seal surfaces.

The term energization is used to mean attainment of the minimum stress state which ensures:

sufficient pressure on the flanks of the threads in contact to prevent unscrewing at a torque less than that used for screwing and also to confer a secondary seal effect along the thread sufficient contact pressure on the seal surfaces to prevent leakage under limit use conditions.

The joint which is the object of this invention can be made with any type of thread known at the moment or which may be surmized from the present state of the art, especially single or multiple threads, with any form of thread, including hooked threads which are generally adopted for joints where the male and female elements have complementary tapered threads, the interference of said threads being reduced according to one of the schemes usually adopted, but being such that the crests of the threads of the female element adhere exactly to the corresponding roots of the threads of the male element whose crests, instead, do not enter into contact with the corresponding roots of the female thread.

In the hooked embodiment, the flanks of the threads with draw the male element into the female element form a negative (hooked) angle to a plane perpendicular to the axis of the joint, said angle being between 0° and −3°, while the secondary flanks are inclined in the same direction, forming an angle of between 8° and 16° to said plane, the interspacing between said flanks ranging from 0.035 to 0.35 mm.

The joint as per this invention is made preferably with the threads described in European Patent Application EP 273016. Said threads are such that the crests of the thread of the female element adhere perfectly to the corresponding roots of the thread of the male element whose crests do not touch the corresponding roots (Antares thread).

By way of example of such threading, a joint for 7" diameter well casing pipes can be made with a thread having a taper of 8.5%, the primary flanks of the thread which remain in contact after making-up forming a nominal angle of 2°26' with a plane perpendicular to the axis of the joint, the secondary flanks sloping in the reverse direction to that of the primaries at a nominal angle 25° to said plane and the nominal distance between said secondary flanks being 0.05 mm when the joint is made-up.

The dimensions indicated in both the above examples are not only nominal, they vary depending on joint size.

The joint which is the object of this invention does not exclude the use of supplementary seal devices consisting, for instance, of a plastic seal ring appropriately positioned between the two seat surfaces of the male and female elements in a housing cut on the seat surface of the female element.

In this way the metal-to-metal joint is protected from any corrosive agents which may be contained in the fluids that come into contact with the pipes themselves.

Further protection can be obtained by applying a lining of protective resin—epoxy or phenolic for instance—to the inner surface of the joint, in contact with said corrosive agents.

The specific combination of elements that help form the hermetic metal seal as per the present invention, especially when in combination with the seat as per the present invention, offers great advantages compared with joints known hitherto.

The seat with an angle of 5°–10°, in fact, offers higher resistance to plastic deformation even in the case of overtorque. Indeed, the angle is such as to generate a state of tangential tensile stress in the nib, which increases the contact pressure between the seal surfaces, without however causing permanent deformation.

The hermetic metal seal, produced by contact between two equally-tapered surfaces, one of which is 0.5–2.5 mm long, offers two advantages:

compared with seals of the tapered surface/spherical surface type, the contact is attained not along a line which is transformed into a finite surface owing to deformation during the subsequent tightening but which occurs right from the beginning on a circumferential surface of finite dimensions that can absorb heavy stresses before reaching plastification;

compared with joints that utilize the contact between two tapered surfaces, the limited size of the contact area as per the present invention allows higher contact pressures to be attained, thus permitting mutual adaptation while still remaining safely within the elastic deformation range.

With a small but finite contact surface as per the invention, reliable uniformity of contact pressure can be ensured.

This advantage is particularly important because it allows precise calculation of the torque needed to guarantee the contact without any leakage when there are given forces acting on the joint which may tend to open up the surfaces in question. With other types of joint, instead, these conditions are achieved only when the joint is made very precisely and the male element is perfectly aligned with the female one: something that certainly cannot be achieved in actual practice.

The advantage of the joint as per the invention increases steadily with repeated assembly and disassembly, when the geometry of the surfaces is generally modified as a result of service stresses.

The data reported below are provided purely as an illustrative example of the foregoing, and are in no way limitative of the scope and purposes of the invention.

To check on the soundness of the metal seal as per the invention and to compare it with two other joints made according to known techniques, the theoretical contact pressure acting on the metal seal of a joint when a contact force of F=105 kN/mm$^2$ is applied has been calculated. The steel of which the joints were made had a yield strength YS of 420 N/mm$^2$. The average diameter D of the joints at the seal surfaces was 80 mm. The three diverse metal seals were characterized by:
(a) theoretically punctiform contact between a tapered surface and a spherical surface (example for comparison);
(b) contact between two tapered surfaces as per the invention;
(c) contact between two large tapered surfaces (example for comparison).

The theoretical contact pressure, as a function of the dimensions and the force with which the surfaces are pressed together, can be calculated in these three cases by the formula:

$$p_a = \frac{290}{\pi D 1_a} \sqrt{F} \text{ (Hertzian contact hypothesis)}$$

$$p_b = p_c = \frac{F}{\pi D 1_{b,c}} \text{ (Very small taper hypothesis)}$$

where:
$p_a$, $p_b$, $p_c$ = contact pressures in the three cases a, b and c
F = contact force D = average diameter of joint at seal surfaces
$1_a$ = width of contact zone in case a, estimated at 0.2 mm
$1_{b,c}$ = width of contact zones in cases b and c, equal to 2 and 5 mm, respectively By substituting and assuming the macrostresses to be constant in the various types of joint, namely F = const. = 105 kN/mm², then:

$p_a = 1870$ N/mm²
$p_b = 210$ N/mm²
$p_c = 84$ N/mm²

These contact pressures reveal the following:

In case a the yield strength of the steel is greatly exceeded, so permanent deformation occurs in the seal zone.

In case c elastic deformation is barely 0.01%, so the seal is assured only if the geometry is perfect.

In case b the value is optimal since elastic deformation of 0.1% is attained, namely half the yield strength.

As an alternative, in cases a and c it could be possible to derive a force F to attain the optimal contact pressure (210 N/mm²). However, in case a it would be necessary to apply a very low force F, and this would be very difficult to control in practice, while in case c the force required would be two-and-a-half times that in case b, so stresses would be much higher and damage the body of the joint.

The effectiveness of the joint as per the present invention is further enhances by the presence of the seat as described. Metal seal joints are frequently used in deep wells where there are high mechanical and environmental stresses (fluid temperature and corrosiveness). Compression of the end of the male element caused by energization of the seat surfaces, reduces tensile stresses on the inner surface of the pipe in contact with the fluid, thus improving the stress corrosion resistance of the joint.

Similarly, in the case of boreholes that are deliverately or accidentally deflected, the stresses involved in transfer of the bending moment through the joint are lower and the neutral axis is shifted towards the extrados, again obtaining a more favourable stress state.

For special applications involving, for instance, environments where corrosive fluids such as H₂S are present, the joint as per the invention is particularly advantageous when made with Cr-Mn-V steels or Cr-Mo steels containing V, Ti and Nb, said steels being quenched and tempered, so they have a tempered martensite structure.

Moreover, when the corrosive fluids are at high temperature—e.g. 150° C.—and are perhaps high in salts, the joint can be made of stainless steel or Ni-based alloys, perhaps associated with known anti-seizure treatments such as implantation of noble metals or hardening elements or electrolytic deposits of hardening and/or lubricating metals (e.g. Ni+Cr). In fact, the combination of metal seal and seat as per the invention, perhaps also with Antares threads for the first type of use described and hooked threads for the second type, ensures that the tensile stress state on the surface in contact with said fluids is always at such a low level that the joint is relatively insensitive to stress corrosion.

The invention will now be described in greater detail by reference to the accompanying drawings which illustrate an embodiment that is provided purely for the purpose of exemplification without in any way limiting the scope of the invention or claims thereto.

FIG. 1 shows an axial section of a screwed joint consisting of a male end 1 and a female end 2, while for convenience of presentation, both male and female threads are identified to 3.

Figure 2:
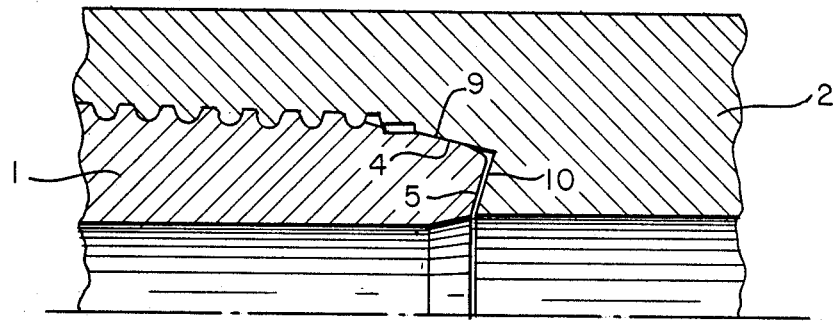
FIG. 2 is an enlarged axial section of the joint prior to the end seating surfaces contacting.
Figure 3:
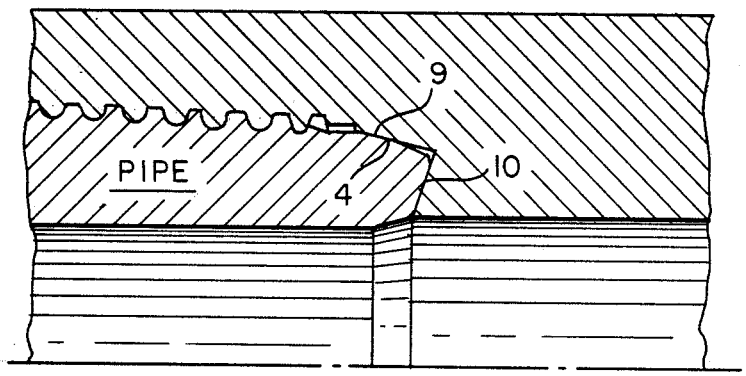
FIG. 3 is an enlarged axial section of the joint after the end seating surfaces contact.

Field A covers the seat and the metal seal as per the invention; the two items are shown in greater detail in FIGS. 2 and 3, the former illustrating the initial phase of the make-up, when the seal surfaces come into contact, and the latter the configuration after tightening.

FIGS. 2 and 3 demonstrate a portion of the end part of female element 2 where, beyond the thread 3, there are two tapered internal surfaces 10 and 9, which, in intersection with the corresponding surfaces of the male element, respectively form the seat and the metallic seal as per the invention.

FIGS. 2 and 3 also illustrate the end part of the male element where there is a series of generically tapered surfaces with different angles beyond the thread 3. Indicated by the number 4 is the surface which will come into contact with the corresponding surface 9 of female element 2, forming the hermetic metal seal, while indicated by the number 5 is the seat surface which comes into contact with the corresponding surface 10 of the female element. These pairs of surfaces (4 and 9), (5 and 10) respectively should have a taper of 6.25-9.25% in the case of the former and form an angle of 5°-10° to a plane perpendicular to the joint axis where the latter is concerned.

As can be seen from the illustration, surface 9 is much larger than surface 4, so that the contact between the two surfaces is always ensure, in the manner envisaged by the invention, for a broad range of constructional tolerances.

FIG. 2 also indicates the priority contact of the seal elements 4 and 9 before the seat surfaces 5 and 10 come into contact and when the joint is being tightened.

FIG. 3 illustrates the joint configuration after make-up when the seat surfaces 5 and 10 are also in contact and the joint is in the use configuration.

To facilitate graphic representation, the contact surfaces of the metal seal have been exaggerated, to make it easier to understand the way the joint works.

The joint as per the invention can be formed either on two pipes which respectively have male and female ends (integral coupling), or it can advantageously be formed on pipes with two male ends which are connected together by sleeves having internal threaded ends (sleeve coupling). The internal part of sleeve couplings is thicker near the mid point in order to accommodate the seal and seat zones.

We claim:

1. Hermetic metal pipe joint, comprising a male element with at least one external tapered thread and a female element with complementary internal threads, an end part of said male element beyond each thread having a conical seal surface and said female element having a conical seal surface with the same taper as that of said conical surface of the male element, the two said conical surfaces on said male and female elements mating upon tightening of the joint, the length of the seal surface of the female element along the generatrix being greater than that of the corresponding seal surface of the male element, said two seal surfaces of the male and female elements having a taper in the range 6.25 to 9.25% relative to the axis of the conical seal surface, the length of the surface of the male element which comes into contact with the corresponding surface of the female element being between 0.5 and 2.5 mm.

2. Hermetic metal pipe joint according to claim 1, wherein the end part of the male element has a nose with a conical seat surface, said conical seat surface mating upon tightening of the joint with a similar conical seat surface in the inner part of the female element, said seat surfaces having the same taper, said taper being comprised in the range 5° to 10° with respect to a plane perpendicular to the joint axes, said seat surfaces operating only after mating of said seal surfaces.

3. Hermetic metal pipe joint according to claim 1, wherein the male and female elements are made of steel alloys selected from Cr-Mn-V and Cr-Mo steels containing V, Ti and Nb, said steels being quenched and tempered and having a tempered martensite structure.

4. Hermetic metal pipe joint according to claim 1, wherein the male and female elements are made of a material selected from stainless steel and Ni-based alloys.

* * * * *